United States Patent
Tamaki

(10) Patent No.: US 11,968,021 B2
(45) Date of Patent: Apr. 23, 2024

(54) WIRELESS COMMUNICATION DEVICE, COMMUNICATION CONTROL METHOD, AND WIRELESS COMMUNICATION SYSTEM

(71) Applicant: Hitachi Astemo, Ltd., Hitachinaka (JP)

(72) Inventor: Satoshi Tamaki, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 267 days.

(21) Appl. No.: 17/424,228

(22) PCT Filed: Jan. 17, 2020

(86) PCT No.: PCT/JP2020/001617
§ 371 (c)(1),
(2) Date: Jul. 20, 2021

(87) PCT Pub. No.: WO2020/153277
PCT Pub. Date: Jul. 30, 2020

(65) Prior Publication Data
US 2022/0116101 A1    Apr. 14, 2022

(30) Foreign Application Priority Data

Jan. 25, 2019   (JP) .................................. 2019-011477

(51) Int. Cl.
*H04B 7/10*   (2017.01)
*H04B 7/12*   (2006.01)
*H04W 4/40*   (2018.01)

(52) U.S. Cl.
CPC ................ *H04B 7/10* (2013.01); *H04B 7/12* (2013.01); *H04W 4/40* (2018.02)

(58) Field of Classification Search
CPC .......... H04B 7/10; H04B 7/12; H04B 7/0689; H04W 4/40
See application file for complete search history.

(56) References Cited

U.S. PATENT DOCUMENTS

| | | | | |
|---|---|---|---|---|
| 5,570,349 A | * | 10/1996 | Bustamante | ........... H04B 7/216 370/335 |
| 2004/0127175 A1 | * | 7/2004 | Lucidarme | ............... H04B 7/10 455/101 |

(Continued)

FOREIGN PATENT DOCUMENTS

| | | |
|---|---|---|
| JP | 2004-343467 A | 12/2004 |
| JP | 2008-099085 A | 4/2008 |

(Continued)

OTHER PUBLICATIONS

Partial Supplementary European Search Report issued in corresponding EP Application No. 20745805.0 dated Oct. 7, 2022 (12 pages).

(Continued)

*Primary Examiner* — Sam K Ahn
*Assistant Examiner* — Amneet Singh
(74) *Attorney, Agent, or Firm* — Foley & Lardner LLP

(57) ABSTRACT

In a wireless communication device, which is mounted on a vehicle and performs wireless communication with a wireless communication device as a communication target using a plurality of frequency channels, the plurality of frequency channels includes a first channel and a second channel, and the first channel uses at least a radio signal of a polarization plane orthogonal to a polarization plane of a radio signal in the second channel.

10 Claims, 9 Drawing Sheets

(56) References Cited

U.S. PATENT DOCUMENTS

| | | | |
|---|---|---|---|
| 2009/0207093 A1* | 8/2009 | Anreddy | H04B 7/0805 |
| | | | 343/893 |
| 2009/0295676 A1 | 12/2009 | Yamazaki et al. | |
| 2010/0303127 A1 | 12/2010 | Akiyama et al. | |
| 2015/0162971 A1* | 6/2015 | Kobayashi | H04B 7/10 |
| | | | 455/62 |
| 2016/0127016 A1* | 5/2016 | Pehlke | H04B 7/0877 |
| | | | 370/329 |
| 2020/0120458 A1* | 4/2020 | Aldana | H04W 4/08 |

FOREIGN PATENT DOCUMENTS

| | | |
|---|---|---|
| JP | 2009-105481 A | 5/2009 |
| JP | 2009-290688 A | 12/2009 |
| JP | 2016-136759 A | 7/2016 |

OTHER PUBLICATIONS

Office Action issued in corresponding Japanese Patent Application No. 2019-011477 dated Jan. 18, 2022 with English translation.
International Search Report with English translation and Written Opinion issued in corresponding application No. PCT/JP2020/001617 dated Mar. 3, 2020.

\* cited by examiner

FIG. 9
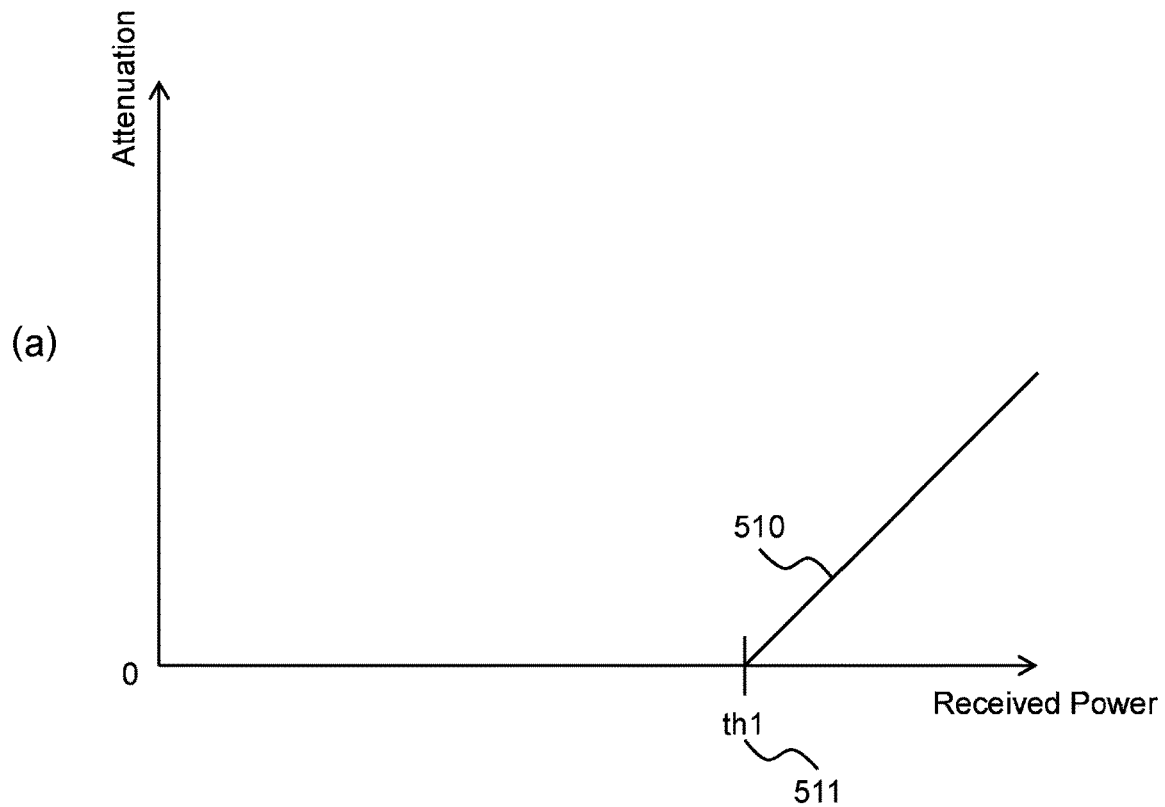
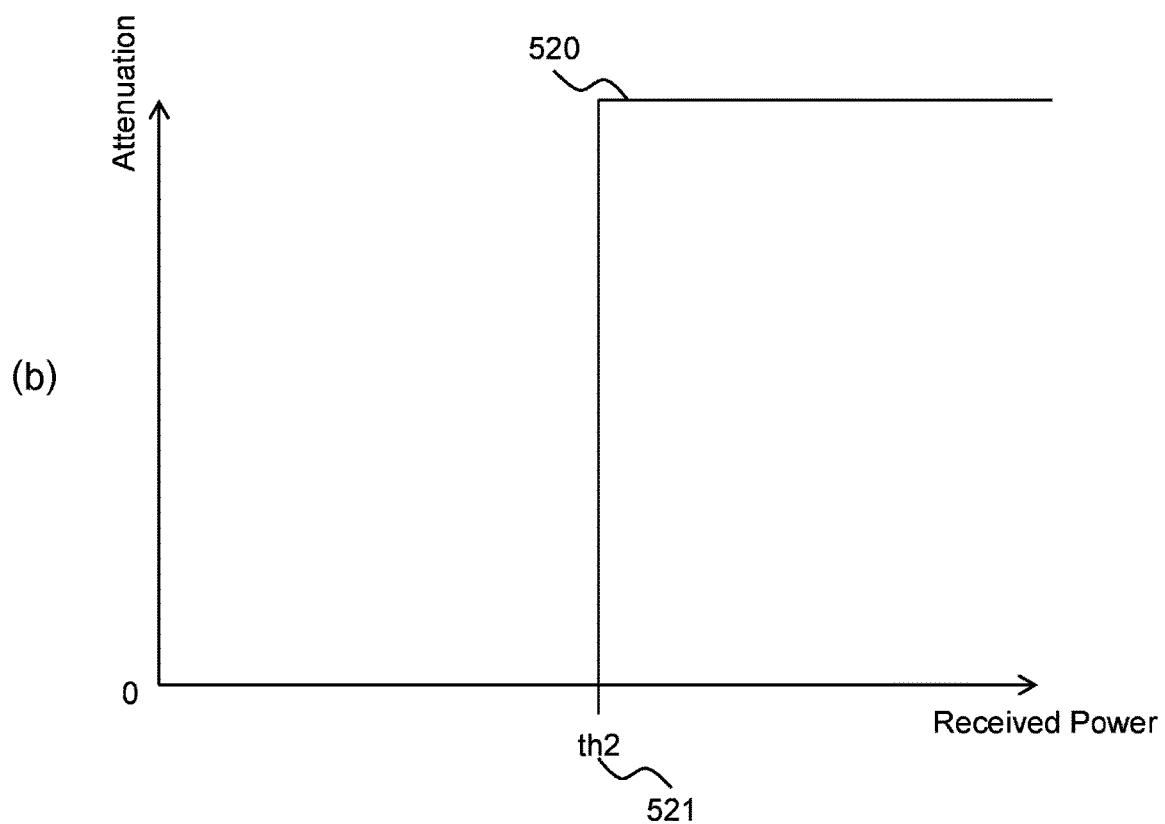

WIRELESS COMMUNICATION DEVICE, COMMUNICATION CONTROL METHOD, AND WIRELESS COMMUNICATION SYSTEM

TECHNICAL FIELD

The present invention relates to a technology for realizing information sharing by communication between moving bodies.

BACKGROUND ART

Vehicle-to-vehicle communication technologies for the purpose of sharing information between vehicles and the like have been widely developed and applied with the advancement of transportation systems. As information sharing between vehicles is stabilized with high communication quality, such as low delay and low error, wider applications are possible, so that communication stabilization is important in the vehicle-to-vehicle communication.

Although various technologies have been proposed for the communication stabilization, for example, a system that simultaneously executes a plurality of communications is often adopted since it is easy to cope with the occurrence of a sudden change in a communication environment, a failure of a device, or the like. On the other hand, radio resources, such as the same or close frequency channels, become interference for another communication when being simultaneously used in a plurality of closely arranged communications, which leads to destabilization of communication quality. Thus, collision avoidance of radio resources is important.

For example, PTL 1 discloses a technology related to a wireless device that transmits a packet signal at a transmission rate different from other communication speeds on the basis of a result of carrier sensing performed over a set waiting time.

CITATION LIST

Patent Literature

PTL 1: JP 2016-136759 A

SUMMARY OF INVENTION

Technical Problem

For example, in the technology disclosed in PTL 1, each of communication devices, such as an in-vehicle terminal, executes carrier sensing, and stops signal transmission of the own communication device while another communication device is performing communication, thereby preventing the plurality of communication devices from simultaneously using the same radio resource. Meanwhile, in the case of performing the carrier sensing, there is a problem that it is difficult to predict a waiting time until communication becomes possible so that a communication delay becomes unstable. Further, the carrier sensing is originally a mechanism used at the time of performing a plurality of communications using the same communication channel, but there is a problem that communication waiting occurs stochastically due to the carrier sensing by being affected by a signal leaking out of a band even in different communication channels when a plurality of adjacent communication devices perform communications.

For example, it is conceivable to change a frequency between channels to avoid interference in a case where a plurality of transceivers is mounted on one automobile for high reliability and a vehicle-to-vehicle communication path is made into a plurality of channels to enable communication to be continued even if there is a trouble in one channel. However, a distance between receivers mounted on the same automobile is a considerably short distance. For example, in a case where two receivers are arranged in the width direction of the automobile, an interval therebetween is about several cm to 350 cm with the width of the automobile as an upper limit, and is within several meters at most. Further, in the case of vehicle-to-vehicle communication in which vehicles travel in a line, communication between front and rear automobiles is short-range communication within the line of sight, and attenuation of reception power is small. Therefore, radio waves arrive at a receiver other than a communication counterpart with substantially equal power, and significant interference between channels is assumed. At this time, if the above-described carrier sensing is performed to avoid the interference, the communication speed decreases due to the waiting time. Further, when transmission power is sufficiently reduced to suppress the delay caused by the carrier sensing, there is a problem of communication delay caused by external noise or the like.

In order to solve the above-described problems, an object of the present invention is to stabilize communication quality, such as a delay time, when a plurality of communication devices on the same moving body simultaneously perform communication.

Solution to Problem

One aspect of the present invention is a wireless communication system mounted on a vehicle. The wireless communication system includes a first communication device and a second communication device mounted on a first moving body. The first communication device and the second communication device perform communication using a plurality of frequency channels, and a polarization plane of a signal used in some of the frequency channels and a polarization plane of a signal used in the other frequency channels are orthogonal to each other.

Advantageous Effects of Invention

According to the present invention, it is possible to stabilize the communication quality, such as the delay time, when the plurality of communication devices on the same moving body simultaneously perform communication.

BRIEF DESCRIPTION OF DRAWINGS

FIG. 9 is an example of a correspondence relationship used for parameter adjustment in the vehicle-to-vehicle communication controller of the present invention.

DESCRIPTION OF EMBODIMENTS

Hereinafter, embodiments of the present invention will be described with reference to the drawings. In a configuration of the invention to be described below, the same reference signs will be commonly used for the same parts or parts having similar functions in different drawings, and the redundant description thereof will be omitted in some cases. When there are a plurality of elements having the same or similar functions, the same reference sign will be sometimes described with different subscripts. When it is unnecessary to distinguish between these plural elements, however, the subscripts will be sometimes omitted in the description.

The notations such as "first", "second", and "third" in the present specification and the like are given to identify components, and do not necessarily limit the number, the order, or the content thereof. Further, a number for identifying a component is used for each context, and a number used in one context does not necessarily indicate the same configuration in another context. Further, a component identified by a certain number is not prevented from also serving a function as a component identified by another number.

In one of embodiments to be described below, an example is described in which each of moving bodies includes a first transceiver and a second transceiver in a wireless communication system that performs communication between the moving bodies. When communication is performed between the transceivers provided in different moving bodies, the first transceiver and the second transceiver use different channels, and the first transceiver and the second transceiver use signals having different polarization planes.

First Embodiment

Figure 1:
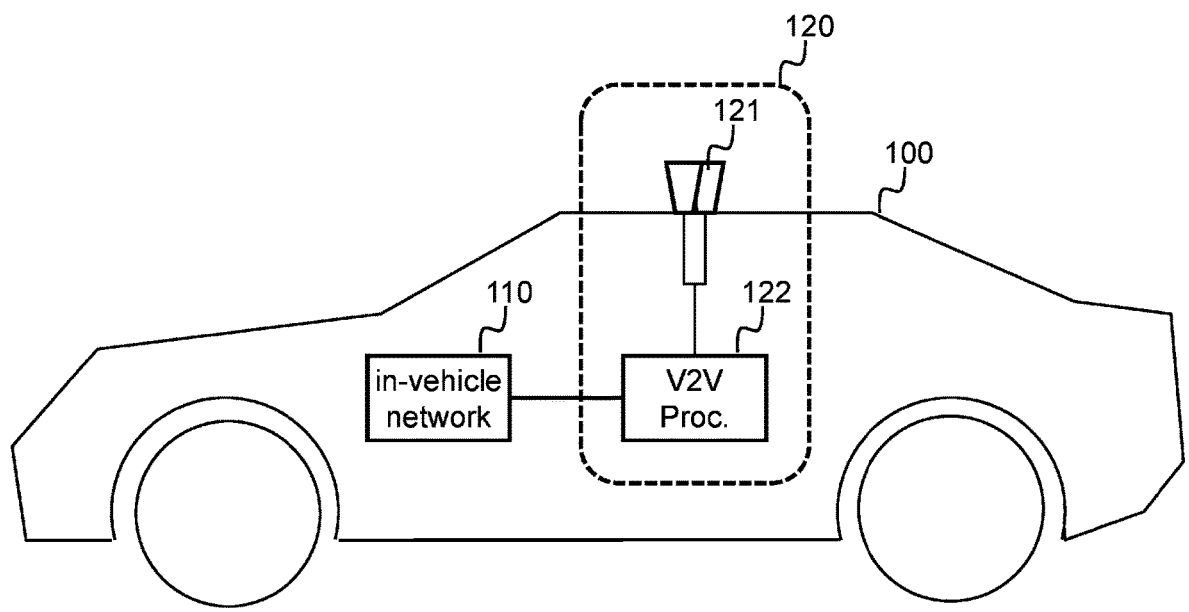
FIG. 1 is a configuration diagram of a moving body adopting a wireless communication system according to an embodiment of the present invention.

FIG. 1 is a configuration diagram of a moving body employing a wireless communication system according to an embodiment of the present invention. In the configuration example illustrated in FIG. 1, an in-vehicle network 110 and a vehicle-to-vehicle communication unit 120 are provided in a moving body 100 such as an automobile. The in-vehicle network 110 is a network that communicates various types of information including control information between devices in the moving body 100. For example, a controller area network (CAN), FlexRay (trademark), or the like is adopted as the in-vehicle network 110. The vehicle-to-vehicle communication unit 120 is a device that performs wireless communication, transmits information and the like on the in-vehicle network 110 in the own moving body 100 to another moving body 100, and further, receives a signal transmitted from the vehicle-to-vehicle communication unit 120 in the other moving body 100 to develop information in the in-vehicle network 110 or the like in the own moving body 100.

The vehicle-to-vehicle communication unit 120 includes a vehicle-to-vehicle communication processing unit (V2V Proc.) 122 and a plurality of vehicle-to-vehicle communication transmitting and receiving units 121. The vehicle-to-vehicle communication processing unit 122 is connected to the in-vehicle network 110. The vehicle-to-vehicle communication processing unit 122 receives information from the in-vehicle network 110, converts a format of the information for vehicle-to-vehicle communication, and sends the information to the vehicle-to-vehicle communication transmitting and receiving unit 121. The vehicle-to-vehicle communication processing unit 122 also converts information received from the vehicle-to-vehicle communication transmitting and receiving unit 121 from the information format for vehicle-to-vehicle communication into an information format for the in-vehicle network, and sends necessary information to the in-vehicle network 110. The vehicle-to-vehicle communication transmitting and receiving unit 121 includes an antenna and transmits information received from the vehicle-to-vehicle communication processing unit 122 as a radio signal. Further, the vehicle-to-vehicle communication transmitting and receiving unit 121 transmits information, obtained by receiving a radio signal, to the vehicle-to-vehicle communication processing unit 122.

A system of the vehicle-to-vehicle communication used in the vehicle-to-vehicle communication unit 120 may be, for example, a wireless local area network (LAN) or a wireless personal area network (PAN), or any other system such as dedicated short range communications (DSRC) may be used.

In the vehicle-to-vehicle communication unit 120, several systems can be considered for division of functions between the vehicle-to-vehicle communication processing unit 122 and the vehicle-to-vehicle communication transmitting and receiving unit 121, but any system may be used. For example, a mode in which the vehicle-to-vehicle communication processing unit 122 and the vehicle-to-vehicle communication transmitting and receiving unit 121 are connected by a wired LAN and the vehicle-to-vehicle communication transmitting and receiving unit 121 performs conversion between a wired LAN signal and a radio signal such as a wireless LAN, amplification of a radio signal, and signal transmission and reception through an antenna is conceivable, and embodiments will be described on the premise of such a configuration hereinafter. Alternatively, as a way of dividing functions, a mode may be adopted in which the vehicle-to-vehicle communication processing unit 122 performs radio signal processing of a baseband frequency band such as a wireless LAN, and the vehicle-to-vehicle communication transmitting and receiving unit 121 performs frequency conversion of a radio signal between the baseband frequency band and a radio frequency band, and performs amplification of a radio signal and transmission and reception of a signal through an antenna. Alternatively, the vehicle-to-vehicle communication transmitting and receiving unit 121 may perform only amplification of a radio signal and transmission and reception of a signal through an antenna, and other functions may be performed by the vehicle-to-vehicle communication processing unit 122.

Alternatively, the vehicle-to-vehicle communication transmitting and receiving unit 121 may perform only transmission and reception of a signal using an antenna, and other functions including amplification of a radio signal may be performed by the vehicle-to-vehicle communication processing unit 122.

Figure 2:
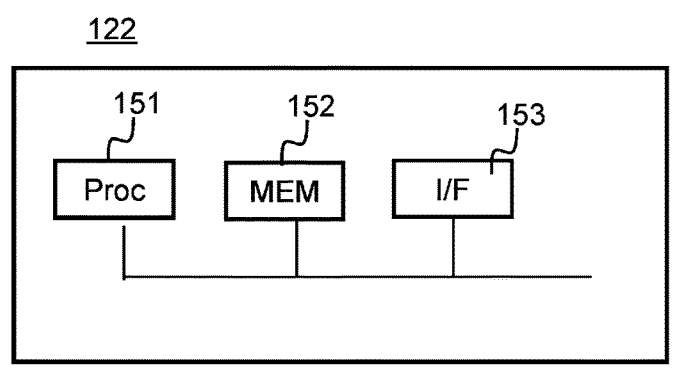
FIG. 2 is a block diagram of a configuration of the wireless communication system according to the embodiment of the present invention.

FIG. 2 is a configuration block diagram of the vehicle-to-vehicle communication processing unit 122. The vehicle-to-vehicle communication processing unit 122 can be configured by hardware including a processor (Proc) 151, a memory (MEM) 152, and an input/output interface (I/F) 153. The processor 151 has a logical operation function such as a CPU, a DSP, and an ASIC. In the present embodiment, functions such as calculation, processing, and control are realized by the processor 151 executing a program stored in the memory 152 or in the processor 151 or by predetermined processing executed by an arithmetic function of an ASIC, an FPGA, or the like in cooperation with another hardware. A program executed by a computer or the like, a function thereof, or a means for realizing the function are sometimes referred to as a "function", a "means", a "portion", a "unit", a "module", or the like. The input/output interface (I/F) 153 includes hardware for transmitting and receiving data to and from the vehicle-to-vehicle communication transmitting and receiving unit 121 and the in-vehicle network 110. Further, various known input/output devices, for example, a display and a keyboard (not illustrated) can be connected to the input/output interface (I/F) 153.

Figure 3:
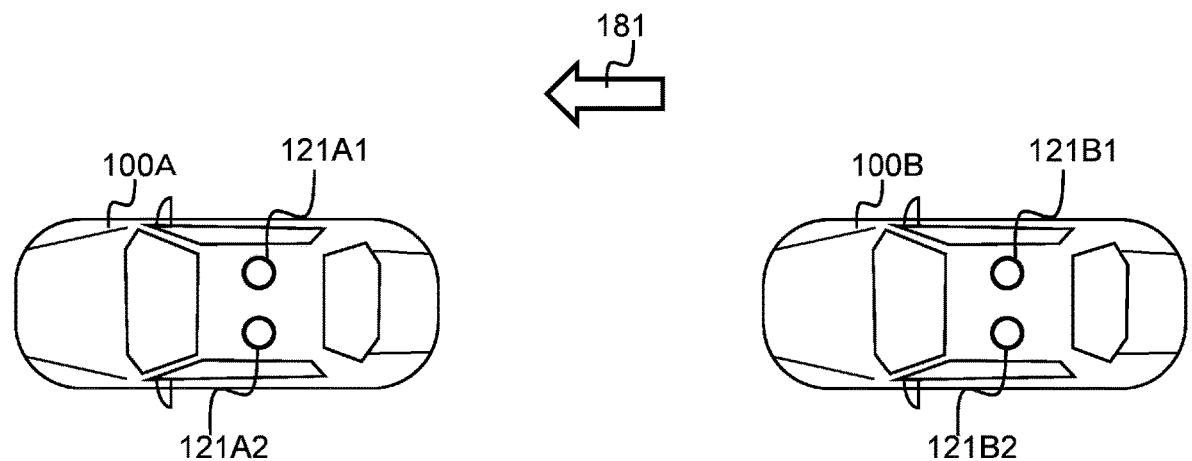
FIG. 3 is a configuration diagram of a vehicle-to-vehicle communication system adopting the wireless communication system according to the embodiment of the present invention.

FIG. 3 illustrates an example of an automobile as the moving body 100 illustrated in FIG. 1, and illustrates a state where information is shared between an automobile 100A and an automobile 100B traveling in a direction of an arrow 181 on a road, for example.

The automobiles 100A and 100B share a CAN signal for in-vehicle control between vehicles via wireless communication using the vehicle-to-vehicle communication transmitting and receiving unit 121. In the example of FIG. 3, the automobile 100A is equipped with, for example, two vehicle-to-vehicle communication transmitting and receiving units 121A1 and 121A2, and the automobile 100B is equipped with two vehicle-to-vehicle communication transmitting and receiving units 121B1 and 121B2. In vehicle-to-vehicle communication, for example, the vehicle-to-vehicle communication transmitting and receiving units 121A1 and 121B1 perform communication using a first channel, and the vehicle-to-vehicle communication transmitting and receiving units 121A2 and 121B2 perform communication using a second channel.

Orthogonality between the first channel and the second channel is not perfect, and communication quality is affected by interference between channels due to leakage power when a part of power used for communication of the first channel leaks to the second channel or a part of power used for communication of the second channel leaks to the first channel. Since interference power between channels is a relative value to power in a channel, for example, when the distance between the automobiles 100A and 100B is short and propagation attenuation is small, the influence of interference power between channels is larger than noise power or power of interference received from external communication. On the other hand, for example, when the distance between the automobiles 100A and 100B is long and propagation attenuation is large, the influence of the interference power between channels is small as compared with the noise power or the power of the interference received from the outside. Therefore, it is important to reduce the interference between channels particularly when the distance between the automobiles 100A and 100B is short and propagation attenuation is small.

When the automobiles 100A and 100B travel in a line as illustrated in FIG. 3, the automobile 100A communicates with the rear automobile 100B, and thus, it is preferable that antennas of the vehicle-to-vehicle communication transmitting and receiving units 121A1 and 121A2 have directivity with respect to the rear side. Further, the automobile 100A uses the plurality of vehicle-to-vehicle communication transmitting and receiving units such as 121A1 and 121A2 for the vehicle-to-vehicle communication with the automobile 100B, and thus, can continue the communication even if there is a trouble such as a failure in one system, and further, the reliability of communication can be improved by the diversity effect. At this time, the vehicle-to-vehicle communication transmitting and receiving units 121A1 and 121A2 are desirably arranged at a distance, for example, arranged to be separated in a vehicle width direction so as to increase the diversity effect.

Figure 4:
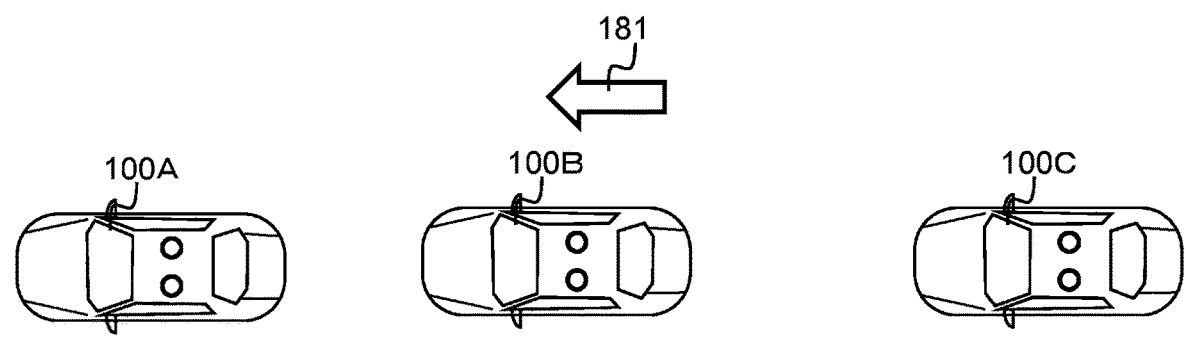
FIG. 4 is another configuration diagram of the vehicle-to-vehicle communication system employing the wireless communication system according to the embodiment of the present invention.

For example, if a CAN signal indicating braking of the front automobile 100A can be shared by the rear automobile 100B, a change in the environment ahead (for example, presence of an obstacle on a road) can be detected in advance, and the rear automobile 100B can take a measure in advance. Further, FIG. 3 illustrates the example of the vehicle-to-vehicle communication between the two front and rear automobiles. As illustrated in FIG. 4, in a case where the automobile 100A transmits information to other automobiles when there are three or more automobiles, for example, the automobile 100B can receive information transmitted from the automobile 100A and the automobile 100B can relay the information to an automobile 100C or the automobile 100A can transmit information to both the automobile 100B and the automobile 100C. Alternatively, the automobile 100A can broadcast information, and both the automobile 100B and the automobile 100C or one automobile therebetween that has received the information can obtain the information. Alternatively, these information transmission methods can be combined and used differently depending on, for example, a content of information to be transmitted.

Figure 5:
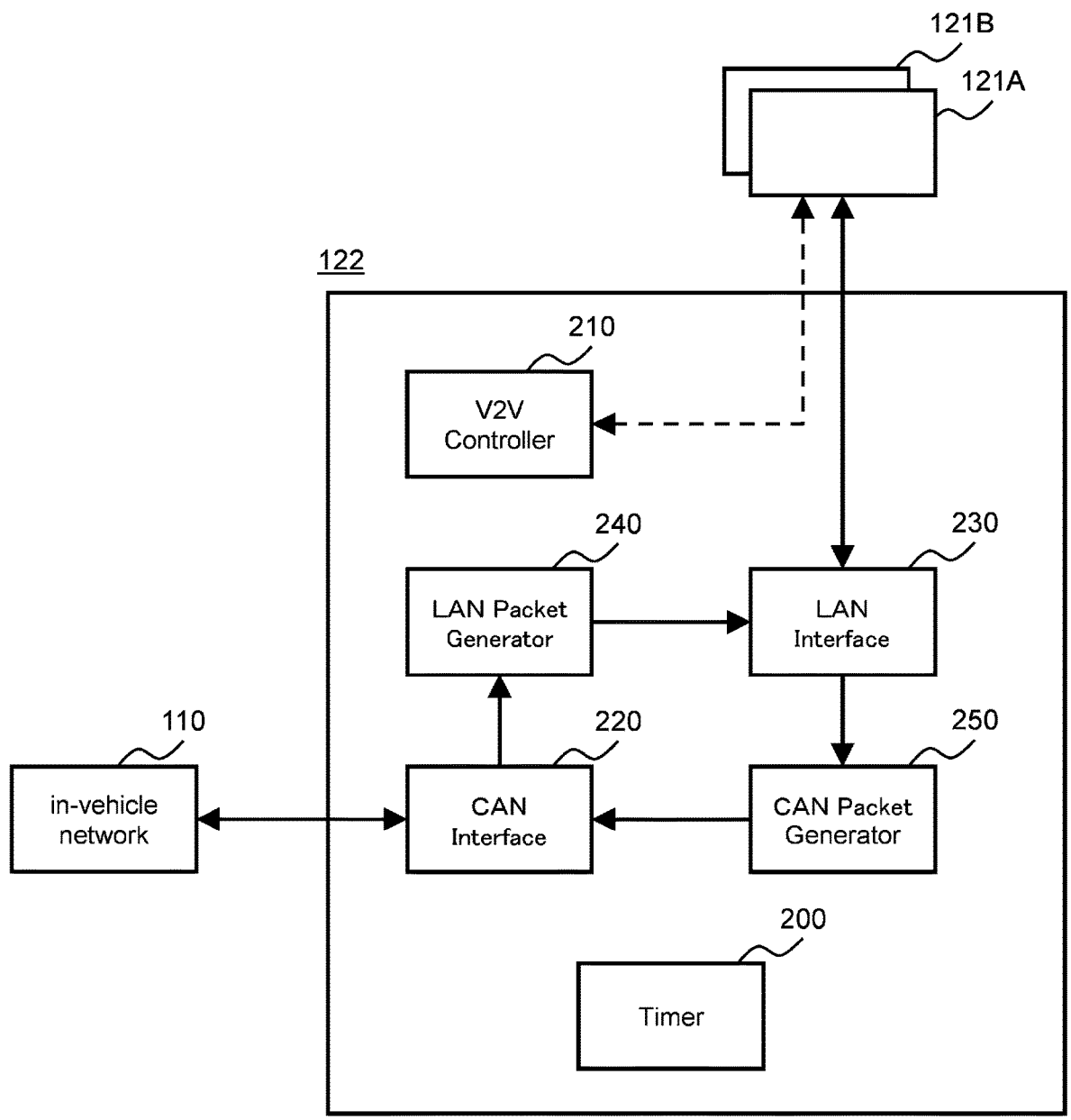
FIG. 5 is a configuration diagram of a vehicle-to-vehicle communication processing unit according to the embodiment of the present invention.

FIG. 5 is a configuration diagram of functions of the vehicle-to-vehicle communication processing unit 122 according to the embodiment of the present invention. The functions are realized by the hardware illustrated in FIG. 2 described above. In the present embodiment, a case of the vehicle-to-vehicle communication processing unit 122 connected to the in-vehicle network 110 via a CAN and connected to the vehicle-to-vehicle communication transmitting and receiving unit 121 that performs transmission and reception using a wireless LAN via a wired LAN is illustrated as an example. The vehicle-to-vehicle communication processing unit 122 of the present example includes: a timer 200, a vehicle-to-vehicle communication controller (V2V controller) 210, a CAN interface 220, a LAN interface 230, a LAN packet generator 240, and a CAN packet generator 250.

The timer 200 has a clock therein, controls an operation timing of each part in the vehicle-to-vehicle communication processing unit 122 based on the clock time and event information notified from each part, and notifies each part of an operation start trigger.

The vehicle-to-vehicle communication controller 210 sets parameters for communication adjustment, for example, transmission power, a transmission bandwidth, a transmission channel, a use antenna, and the like for the vehicle-tovehicle communication transmitting and receiving unit 121 (the vehicle-to-vehicle communication transmitting and receiving units 121A and 121B) and the vehicle-to-vehicle communication processing unit 122. Incidentally, when the parameters are set by the vehicle-to-vehicle communication controller 210 for the vehicle-to-vehicle communication transmitting and receiving unit 121, a control signal may be transmitted on the LAN via the LAN interface 230, or the control signal may be transmitted via a different interface, for example, serial communication or the like. Further, the vehicle-to-vehicle communication controller 210 receives information necessary for communication adjustment, for example, a value such as reception power, from the vehicle-to-vehicle communication transmitting and receiving unit 121 via the LAN interface 230, from the vehicle-to-vehicle communication transmitting and receiving unit 121 via a different interface, for example, serial communication or the like, or from any part in the vehicle-to-vehicle communication processing unit 122. Further, in order to notify the vehicle-to-vehicle communication controller 210 on the moving body 100, which serves as a communication counterpart, of the parameter for communication adjustment, the vehicle-to-vehicle communication controller 210 may output the adjustment parameter to the LAN interface 230. Similarly, the vehicle-to-vehicle communication controller 210 may receive the adjustment parameter, notified from the vehicle-to-vehicle communication controller 210 on the moving body 100 as the communication counterpart, from the LAN interface 230.

The CAN interface 220 receives a CAN signal from in-vehicle network 110, stores the received information, and notifies the timer 200 of a CAN signal reception event. Further, the CAN interface 220 converts CAN transmission information received from the CAN packet generator 250 into a CAN signal, and outputs the CAN signal to in-vehicle network 110.

The LAN interface 230 receives an input of a LAN signal from the plurality of vehicle-to-vehicle communication transmitting and receiving units 121 (vehicle-to-vehicle communication transmitting and receiving units 121A and 121B), stores the input information, and notifies the timer 200 of a LAN signal reception event. Incidentally, when the input information is stored, header information such as a sequence number may be confirmed, and such an input signal may be discarded when it is determined that the same LAN signal has already been input and stored. Further, when it is determined that the same LAN signal has already been input and stored, the stored signal may be compared with the input signal, a consistent part may be discarded, and inconsistent parts may be stored as a plurality of pieces of information. Further, the notification of the LAN signal reception event may be always performed every time an input of a LAN signal is received, or is not necessarily performed when it is determined that the same LAN signal has already been input and stored. Further, the LAN interface 230 converts LAN transmission information received from the LAN packet generator 240 into a LAN signal and outputs the LAN signal to the plurality of vehicle-to-vehicle communication transmitting and receiving units 121. When an adjustment parameter is included in the LAN signal received from the vehicle-to-vehicle communication transmitting and receiving unit, the LAN interface 230 also notifies the vehicle-to-vehicle communication controller 210 of the adjustment parameter.

The LAN packet generator 240 receives an operation start trigger from the timer 200 periodically or on the basis of the CAN signal reception event, acquires information stored in the CAN interface 220, and performs unit conversion or the like based on the acquired information as necessary, and then, generates and outputs a LAN signal to the LAN interface 230. Further, in a case where there is a parameter for adjusting communication received from the vehicle-to-vehicle communication controller 210, the LAN packet generator 240 may output the LAN signal added with the adjustment parameter to the LAN interface 230 at the time of generating the LAN signal.

The CAN packet generator 250 receives an operation start trigger from the timer 200 periodically or on the basis of the LAN signal reception event, acquires information stored in the LAN interface 230, and performs unit conversion or the like based on the acquired information as necessary, and then, generates and outputs a CAN signal to the CAN interface 220. Incidentally, when a plurality of pieces of information based on the same LAN signal are stored in the LAN interface 230, only one piece of information is selected to generate the CAN signal. As a method of selecting only one piece of information, for example, when three or more pieces of information are stored and two or more pieces of information coincide with each other, information having a large number of coincidences may be selected. Alternatively, the oldest information stored in the LAN interface 230 may be selected. Alternatively, the latest information stored in the LAN interface 230 may be selected, or information may be randomly selected.

Figure 6:
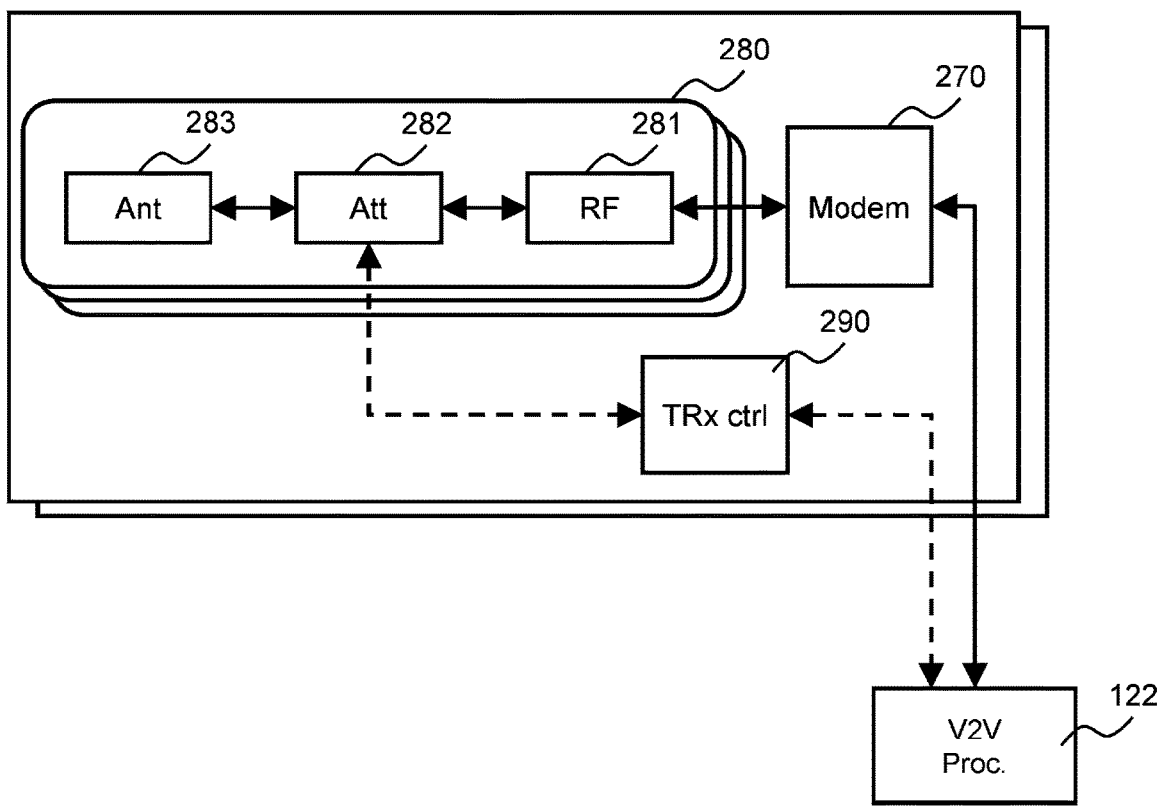
FIG. 6 is a configuration diagram of a vehicle-to-vehicle communication transmitting and receiving unit according to the embodiment of the present invention.

FIG. 6 is a configuration diagram of functions of the vehicle-to-vehicle communication transmitting and receiving unit 121 according to the embodiment of the present invention. The vehicle-to-vehicle communication transmitting and receiving unit 121 includes a modem 270, one or a plurality of radio frequency units 280, and a transmission and reception controller (TRx ctrl) 290.

The modem 270 receives a LAN signal from the vehicle-to-vehicle communication processing unit 122, performs modulation processing or the like to perform vehicle-to-vehicle wireless communication, and outputs the LAN signal as a baseband transmission signal to the one or plurality of radio frequency units 280. The modem 270 also performs demodulation processing or the like on a baseband reception signal received from the radio frequency unit 280, and outputs the processed signal as a LAN signal to the vehicle-to-vehicle communication processing unit 122. The modem 270 also measures a reception power value using the received baseband reception signal, and outputs the measured reception power value to the vehicle-to-vehicle communication processing unit 122.

The radio frequency unit 280 includes an RF module (RF) 281, a power attenuation unit (Att) 282, and an antenna (Ant) 283. In the radio frequency unit 280, the baseband transmission signal received from the modem 270 is converted and amplified into a signal at a radio frequency of, for example, several 100 MHz to several 10 GHz in the RF module 281, power is adjusted by the power attenuation unit 282, and the radio signal is transmitted as a radio wave via the antenna 283. Further, the radio frequency unit 280 may also receive a radio signal through the antenna 283, adjusts power by the power attenuation unit 282, amplifies and converts the signal into a baseband reception signal by the RF module 281, and outputs the baseband reception signal to the modem 270.

Incidentally, it is necessary for each of the moving bodies 100 to have the antenna 283 capable of transmitting and receiving signals having a plurality of polarization planes in order to control the polarization plane to be described later. For this purpose, for example, one or a plurality of the vehicle-to-vehicle communication transmitting and receiving units 121 include the antenna 283 capable of transmitting and receiving one or a plurality of horizontally polarized signals, and the antenna 283 capable of transmitting and receiving one or a plurality of vertically polarized signals. Alternatively, some or all of the antennas 283 may have a plurality of antenna elements, and may have a function of changing a polarization plane by switching an element to be used according to a control signal.

The transmission and reception controller 290 controls each part of the radio frequency unit 280 on the basis of the parameter setting received from the vehicle-to-vehicle communication processing unit 122. For example, in a case where stop of a signal having a specific polarization plane is set, transmission of the signal having the polarization plane is stopped or reception of the signal having the polarization plane is stopped by adjusting an amplification gain of the RF module 281 connected to the antenna 283 corresponding to the polarization plane, by setting an attenuation amount of the power attenuation unit 282 to a large value such as a maximum settable value, or by changing the polarization plane if the antenna 283 has a function of changing the polarization plane. Further, for example, in a case where a change of signal power is set, the attenuation amount of the power attenuation unit 282 is changed.

Figure 7:
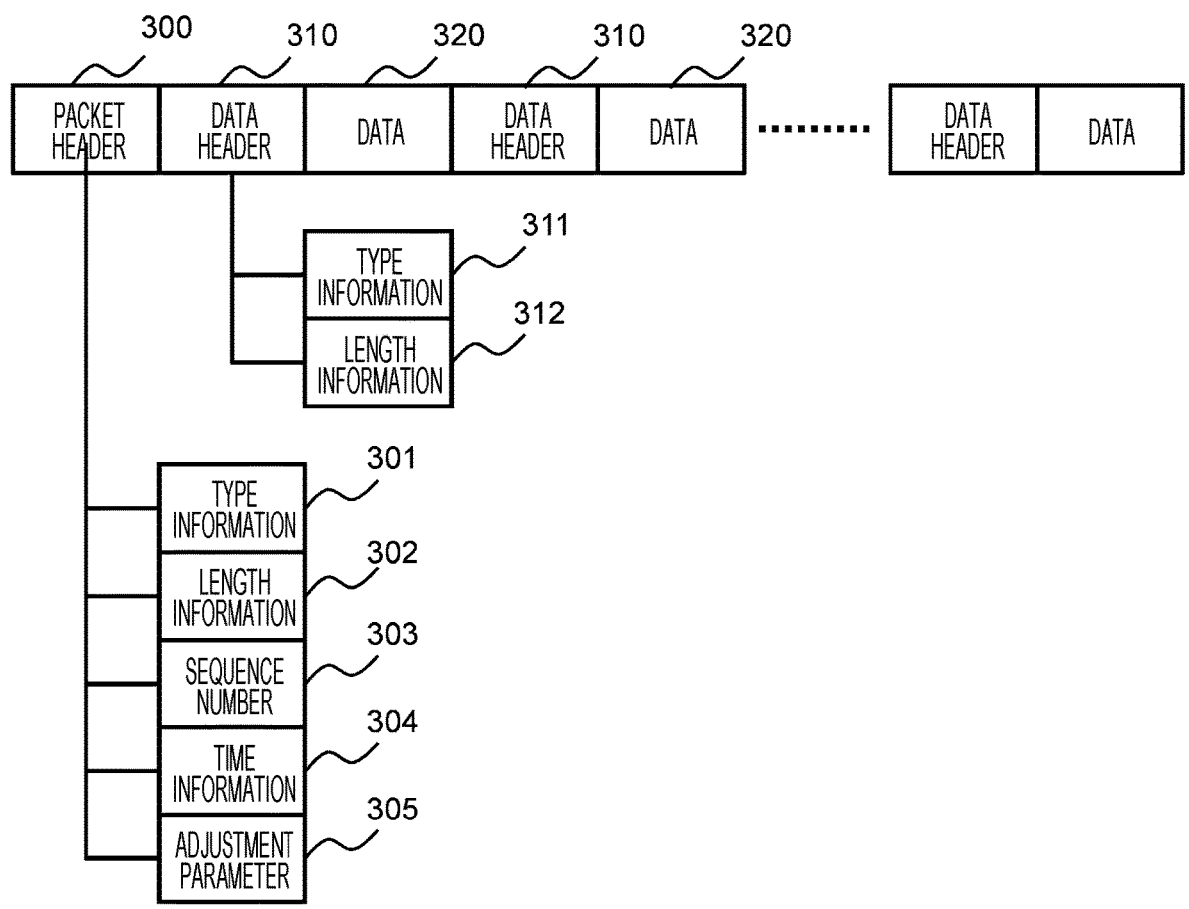
FIG. 7 is an example of LAN transmission information generated by a LAN packet generator according to the embodiment of the present invention.

FIG. 7 is an example of the LAN transmission information (LAN packet) generated by the LAN packet generator 240 of the embodiment of the present invention or received by the vehicle-to-vehicle communication transmitting and receiving unit 121. The LAN transmission information includes a LAN packet header 300, one or a plurality of LAN data headers 310, and one or a plurality of pieces of LAN data 320.

The LAN packet header 300 includes some or all of packet type information 301, packet length information 302, sequence number information 303, time information 304, and an adjustment parameter 305. The LAN data header 310 includes one or all of data type information 311 and data length information 312. The LAN data 320 includes information stored in the CAN interface 220, and a type of the information is described in the data type information 311 of the LAN data header 310. The information stored in the CAN interface 220 included in the LAN data 320 is, for example, information related to a motion of the moving body 100, such as speed information and acceleration information, or information related to motion control such as an accelerator and a brake of the moving body 100, or includes a combination thereof or other information.

Figure 8:
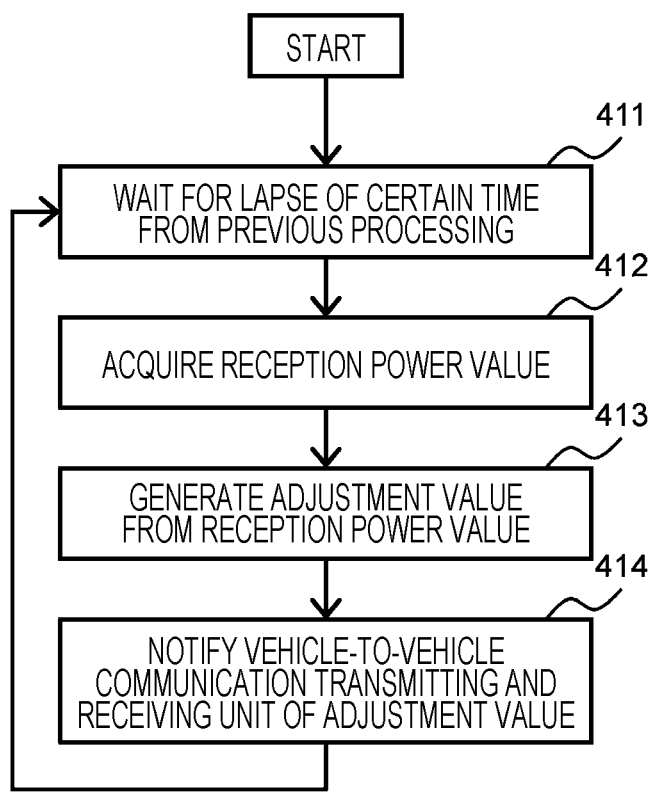
FIG. 8 is an example of a flow of parameter adjustment in a vehicle-to-vehicle communication controller of the present invention.

FIG. 8 is an example of a flow of parameter adjustment in the vehicle-to-vehicle communication controller of the present invention.

In a case where parameter adjustment processing has already been performed even once in processing 411, the vehicle-to-vehicle communication controller 210 first waits for the processing such that an elapsed time since the previous parameter adjustment processing becomes a certain value or more. Next, in processing 412, a reception power value measured by the vehicle-to-vehicle communication transmitting and receiving unit 121 is acquired. Next, a parameter adjustment value is created on the basis of the reception power value in processing 413, and the adjustment value created is notified to the vehicle-to-vehicle communication transmitting and receiving unit 121 in processing 414.

For example, when the reception power value is large, the parameter adjustment value in processing 413 is set to such a value that the plurality of vehicle-to-vehicle communication transmitting and receiving units 121A and 121B are controlled to use different polarized waves. Further, the creation of the parameter adjustment value in processing 413 is performed to set such a value that control is performed to reduce transmission signal power of a signal transmitted from each antenna of the vehicle-to-vehicle communication transmitting and receiving units 121A and 121B when the reception power value is large or to attenuate a reception signal input from an antenna end before amplification.

FIG. 9 is an example of a correspondence relationship used for parameter adjustment in the vehicle-to-vehicle communication controller of the present invention.

In order to perform the above-described control, for example, as an example of a configuration, the moving body 100 includes the two vehicle-to-vehicle communication transmitting and receiving units 121A and 121B, and each of the vehicle-to-vehicle communication transmitting and receiving units 121A and 121B includes the radio frequency unit 280 having one or a plurality of horizontally polarized antennas and the radio frequency unit 280 having one or a plurality of vertically polarized antennas. At this time, for example, the radio frequency unit 280 including the horizontally polarized antenna of the vehicle-to-vehicle communication transmitting and receiving unit 121A and the radio frequency unit 280 including the vertically polarized antenna of the vehicle-to-vehicle communication transmitting and receiving unit 121B are controlled so as to have the relationship between the reception power and the attenuation amount as illustrated in FIG. 9(*a*). That is, a control value is set in the power attenuation unit 282 such that power is attenuated as in a correspondence relationship 510 in which an attenuation value increases as the reception power increases in a case where the reception power is larger than a threshold 511. Further, for example, the radio frequency unit 280 including the vertically polarized antenna of the vehicle-to-vehicle communication transmitting and receiving unit 121A and the radio frequency unit 280 including the horizontally polarized antenna of the vehicle-to-vehicle communication transmitting and receiving unit 121B are controlled so as to have the relationship between the reception power and the attenuation amount as illustrated in FIG. 9(*b*). That is, a control value is set in the power attenuation unit 282 as in a relationship 520 in which a signal is attenuated greatly in a case where the reception power is larger than a threshold 521. Alternatively, in the case where the reception power is larger than the threshold 521, a control value is set to turn off a power amplifier such that power decreases.

With the above-described control, communication is performed simultaneously by two systems so that the reliability is high. Further, the interference between channels can be suppressed in the case where the inter-vehicle distance is short and the reception signal power of the vehicle-to-vehicle communication is large, and the polarization diversity effect can be obtained in the case where the inter-vehicle distance is long and the reception signal power of the vehicle-to-vehicle communication is small. Thus, the stable vehicle-to-vehicle communication can be realized.

Further, in order to perform the above-described control, as another configuration, the moving body 100 includes the two vehicle-to-vehicle communication transmitting and receiving units 121A and 121B, the vehicle-to-vehicle communication transmitting and receiving unit 121A includes only the radio frequency unit 280 having one or a plurality of horizontally polarized antennas, and the vehicle-to-vehicle communication transmitting and receiving unit 121B includes only the radio frequency unit 280 having one or a plurality of vertically polarized antennas. At this time, for example, the radio frequency unit 280 including the horizontally polarized antenna of the vehicle-to-vehicle communication transmitting and receiving unit 121A and the radio frequency unit 280 including the vertically polarized antenna of the vehicle-to-vehicle communication transmitting and receiving unit 121B are controlled so as to have the relationship between the reception power and the attenuation amount as illustrated in FIG. 9(a). That is, a control value is set in the power attenuation unit 282 such that power is attenuated as in a correspondence relationship 510 in which an attenuation value increases as the reception power increases in a case where the reception power is larger than a threshold 511.

With the above-described control, the polarization diversity effect is limited as compared with the previous configuration, but the reliability is high since communication is performed simultaneously by two systems. Further, the stable vehicle-to-vehicle communication in which the interference between channels is suppressed in the case where the inter-vehicle distance is short and the reception signal power of the vehicle-to-vehicle communication is large can be realized with a simpler configuration.

Incidentally, the reception power value on the horizontal axis in FIG. 9 is not power of a reception signal reaching the modem 270 but power at a reception antenna end. That is, for example, even when the power of the reception signal reaching the modem 270 is equal between a case where there is no attenuation in the power attenuation unit 282 and a case where the attenuation is performed by 10 dB, the reception power, which is the horizontal axis in FIG. 9, becomes a value reduced by 10 dB in the latter.

Further, for example, the reception power value illustrated in FIG. 9 may be an instantaneous value that has been measured, a value obtained by simply averaging values measured within a certain period, or an average value obtained using a low-pass filter such as IIR. Further, each of the thresholds 511 and 512 illustrated in FIG. 9 may be a value having hysteresis instead of a single value. That is, values, smaller than the thresholds 511 and 512 for making a determination to perform power attenuation in a state where power has not been attenuated in the power attenuation unit 282, may be additionally used as thresholds 511 and 512 for making a determination to stop power attenuation in a state where the power attenuation is performed.

Further, values of the thresholds 511 and 512 illustrated in FIG. 9 may be changed according to a situation. For example, when the modem 270 detects a situation where interference power from the periphery is large, the values of the thresholds 511 and 512 may be increased to perform control such that power is hardly attenuated.

Further, three or more vehicle-to-vehicle communication transmitting and receiving units may be used although the case of using the two vehicle-to-vehicle communication transmitting and receiving units 121 has been described above. Further, the case of using two types of polarized waves, that is, the horizontally polarized wave and vertically polarized wave has been described above, but, for example, a combination of other polarized waves having an orthogonal relationship, such as a right-handed polarized wave and a left-handed polarized wave, may be used. Furthermore, it is also possible to use two or more polarized waves, which are not orthogonal to each other, although the effect of reducing the interference between channels is limited.

Second Embodiment

Figure 10:
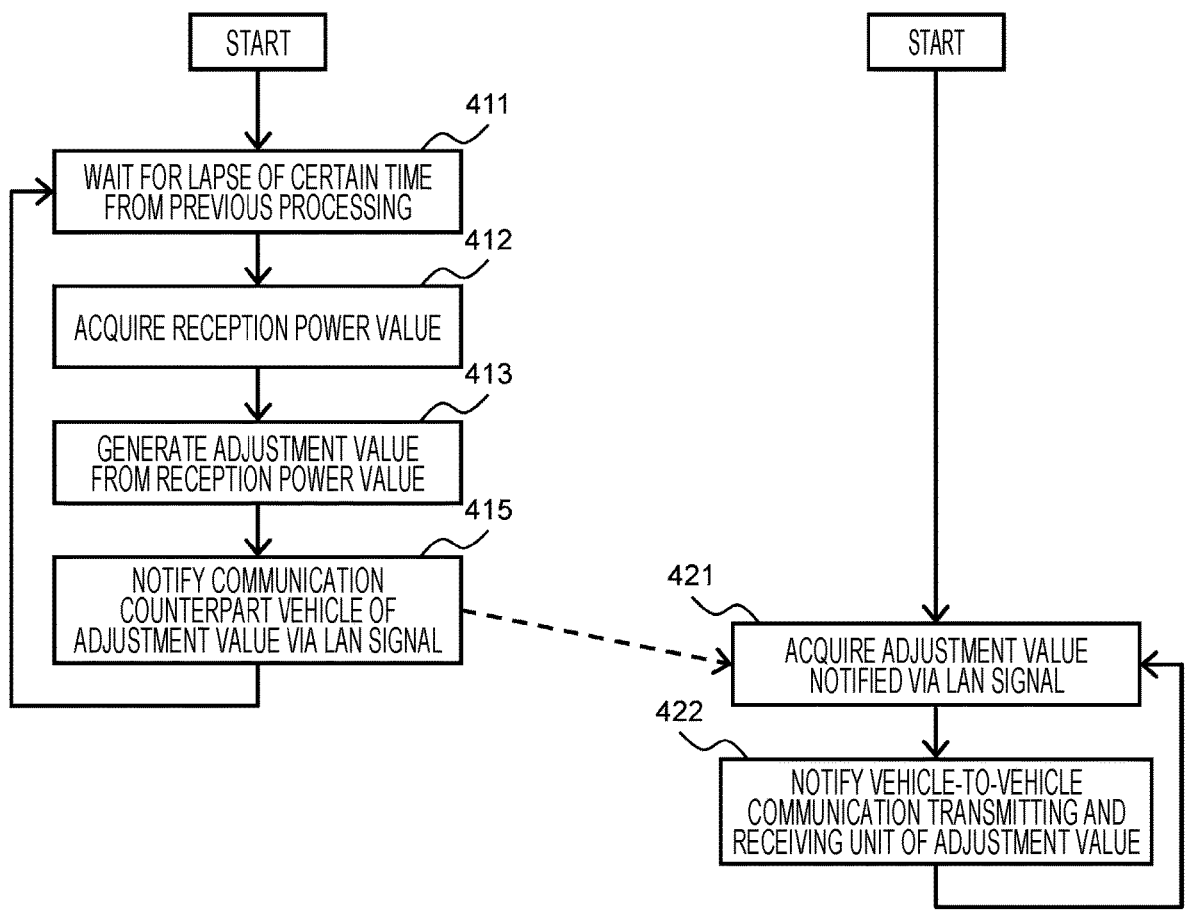
FIG. 10 is another example of the flow of parameter adjustment in the vehicle-to-vehicle communication controller of the present invention.

FIG. 10 is another example of the flow of parameter adjustment in the vehicle-to-vehicle communication controller of the present invention. In a configuration of the present embodiment, reception power is measured on one moving body 100 side, and parameter adjustment of the radio frequency unit 280 is performed on the other moving body 100 side when the parameter adjustment is performed.

In the flow of FIG. 10, in a case where parameter adjustment processing has already been performed even once in processing 411, the vehicle-to-vehicle communication controller 210 first waits for the processing such that an elapsed time since the previous parameter adjustment processing becomes a certain value or more. Next, in processing 412, a reception power value measured by the vehicle-to-vehicle communication transmitting and receiving unit 121 is acquired. Next, in processing 413, a parameter adjustment value is created based on the reception power value, and the vehicle-to-vehicle communication controller 210 on the moving body 100 as a communication counterpart is notified of the adjustment value created in processing 415 using a LAN signal of FIG. 7 configured to perform communication between vehicles. The vehicle-to-vehicle communication controller 210 on the communication counterpart side first acquires the adjustment value notified via the LAN signal in processing 421, and then, notifies the vehicle-to-vehicle communication transmitting and receiving unit 121 of the adjustment value in processing 422.

Third Embodiment

Figure 11:
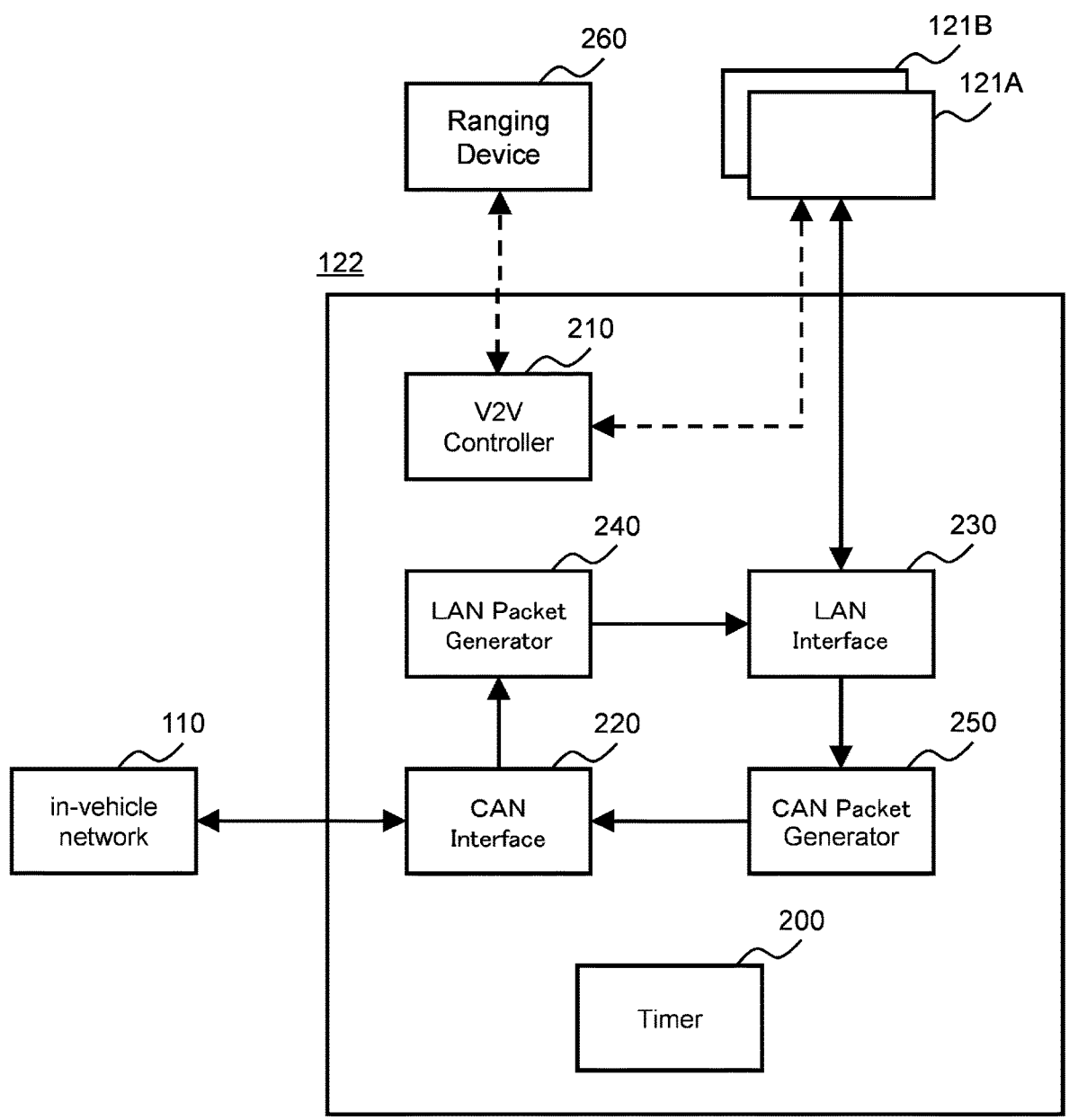
FIG. 11 is a configuration diagram of a vehicle-to-vehicle communication processing unit according to another embodiment of the present invention.

FIG. 11 is a configuration diagram of a vehicle-to-vehicle communication processing unit according to another embodiment of the present invention. In the configuration of the present embodiment, parameter adjustment is performed based on a distance between vehicles. In the present embodiment, a case of the vehicle-to-vehicle communication processing unit 122 connected to the in-vehicle network 110 via a CAN and connected to the vehicle-to-vehicle communication transmitting and receiving unit 121 that performs transmission and reception using a wireless LAN via a wired LAN is illustrated as an example. The vehicle-to-vehicle communication processing unit 122 of the present example includes: the timer 200, the vehicle-to-vehicle communication controller (V2V controller) 210, the CAN interface 220, the LAN interface 230, the LAN packet generator 240, and the CAN packet generator 250. A ranging device 260 is provided in the vehicle-to-vehicle communication processing unit 122, or the ranging device 260 is externally provided and connected to the vehicle-to-vehicle communication controller 210 inside the vehicle-to-vehicle communication processing unit 122.

An operation of the vehicle-to-vehicle communication processing unit 122, except for operations of the ranging device 260 and the related vehicle-to-vehicle communication controller 210 is the same as the operation illustrated with reference to FIG. 5 in the previous example. In the configuration of the present example, the ranging device 260 measures a distance between the next moving body 100 and the moving body 100 to be subjected to vehicle-to-vehicle communication, and notifies the vehicle-to-vehicle communication controller 210 of the measured distance. The vehicle-to-vehicle communication controller 210 creates a parameter adjustment value based on the distance similarly to the case of creating the parameter adjustment value based on the reception power in FIGS. 8 and 9. That is, for example, when the inter-vehicle distance is small, a value is set such that the plurality of vehicle-to-vehicle communication transmitting and receiving units 121A and 121B are controlled to use different polarized waves. Further, for example, when the inter-vehicle distance is small, a value is set such that control is performed to reduce transmission signal power of a signal transmitted from each antenna of the vehicle-to-vehicle communication transmitting and receiving units 121A and 121B or to attenuate a reception signal input from an antenna end before amplification.

According to the embodiments described above, the present invention has the following effects.

(1) A wireless communication device (the vehicle-to-vehicle communication unit 120) is mounted on a vehicle (the moving body 100), and performs wireless communication with a wireless communication device (the vehicle-to-vehicle communication unit 120) as a communication target using a plurality of frequency channels. The plurality of frequency channels include a first channel and a second channel, and the first channel uses a radio signal of a polarization plane orthogonal to at least a polarization plane of a radio signal in the second channel. In this manner, interference between channels can be suppressed, and highly reliable wireless communication can be performed, so that communication quality such as a delay time can be stabilized.

(2) The wireless communication device (vehicle-to-vehicle communication unit 120) includes: a first transceiver (the vehicle-to-vehicle communication transmitting and receiving unit 121A) that corresponds to the first channel and is capable of transmitting and receiving radio signals with two orthogonal polarization planes; and a second transceiver (the vehicle-to-vehicle communication transmitting and receiving unit 121B) that corresponds to the second channel and is capable of transmitting and receiving radio signals with two orthogonal polarization planes. The first transceiver and the second transceiver can select a first communication mode in which a radio signal is transmitted and received using both of the two polarization planes; and a second communication mode in which a radio signal is transmitted and received using one of the two polarization planes. In the second communication mode, a polarization plane used by the first transceiver and a polarization plane used by the second transceiver are orthogonal to each other. In this manner, the wireless communication can be performed using the optimum polarization plane according to a situation, and the communication quality can be further stabilized.

(3) The wireless communication device (vehicle-to-vehicle communication unit 120) can measure reception power of a radio signal received from the wireless communication device (vehicle-to-vehicle communication unit 120) as the communication target, and switch between the first communication mode and the second communication mode based on the reception power. In this manner, the optimum communication mode can be selected according to the reception power.

(4) The wireless communication device (vehicle-to-vehicle communication unit 120) can also measure reception power of a radio signal received from the wireless communication device (vehicle-to-vehicle communication unit 120) as the communication target, and transmit a radio signal including information for switching between the first communication mode and the second communication mode based on the reception power, to the wireless communication device as the communication target. In this manner, the communication mode can be switched even in the wireless communication device as the communication target according to the reception power measured by the wireless communication device. As a result, the optimum communication mode can be selected in vehicle-to-vehicle communication performed between these wireless communication devices.

(5) The wireless communication device (vehicle-to-vehicle communication unit 120) can measure an inter-vehicle distance between a first vehicle (the automobile 100A) equipped with the wireless communication device and a second vehicle (the automobile 100B) equipped with the wireless communication device as the communication target, and switch between the first communication mode and the second communication mode based on the inter-vehicle distance. In this manner, the optimum communication mode can be selected according to the inter-vehicle distance.

(6) The wireless communication device (vehicle-to-vehicle communication unit 120) can also measure an inter-vehicle distance between a first vehicle (the vehicle 100A) equipped with the wireless communication device and a second vehicle (the automobile 100B) equipped with the wireless communication device as the communication target, and transmit a radio signal including information for switching between the first communication mode and the second communication mode based on the inter-vehicle distance, to the wireless communication device as the communication target. In this manner, the communication mode can be switched even in the wireless communication device as the communication target according to the reception power measured by the wireless communication device. As a result, the optimum communication mode can be selected in vehicle-to-vehicle communication performed between these wireless communication devices.

(7) The wireless communication device (vehicle-to-vehicle communication unit 120) measures reception power of a radio signal received from the wireless communication device (vehicle-to-vehicle communication unit 120) as the communication target, and adjusts at least one of transmission power of the radio signal to be transmitted to the wireless communication device as the communication target and an attenuation amount of the radio signal when performing reception signal processing of a signal received from the wireless communication device as the communication target, based on the reception power. In this manner, it is possible to reliably suppress the interference between channels and realize the highly reliable wireless communication.

(8) The wireless communication device (vehicle-to-vehicle communication unit 120) can measure reception power of a radio signal received from the wireless communication device (vehicle-to-vehicle communication unit 120) as the communication target, and transmit a radio signal including information for adjusting at least one of transmission power of the radio signal transmitted by the wireless communication device as the communication target and an attenuation amount of the radio signal when the wireless communication device as the communication target performs reception signal processing, based on the reception power, to the wireless communication device as the communication target. In this manner, the transmission/reception power can be adjusted according to the reception power measured by the wireless communication device even in the wireless communication device as the communication target. As a result, the interference between channels can be reliably suppressed in the vehicle-tovehicle communication performed between these wireless communication devices, and the highly reliable wireless communication can be realized.

(9) The wireless communication device (vehicle-to-vehicle communication unit 120) includes a first transceiver (the vehicle-to-vehicle communication transmitting and receiving unit 121A) corresponding to the first channel; a second transceiver (the vehicle-to-vehicle communication transmitting and receiving unit 121B) corresponding to the second channel; and a communication processing unit (the vehicle-to-vehicle communication processing unit 122) connected to the first transceiver and the second transceiver. Each of the first transceiver and the second transceiver transmits a radio signal generated based on transmission information input from the communication processing unit to the wireless communication device (vehicle-to-vehicle communication unit 120) as the communication target, and outputs reception information based on the radio signal, received from the wireless communication device as the communication target, to the communication processing unit. At this time, the communication processing unit can output the common transmission information to the first transceiver and the second transceiver, and select and acquire one of the reception information output from the first transceiver and the reception information output from the second transceiver. In this manner, the same information can be transmitted and received in the plurality of frequency channels, and thus, the wireless communication with higher reliability can be realized.

Incidentally, the present invention is not limited to the above-described embodiments, and may include various modifications and equivalent configurations that fall within the scope of the appended claims. For example, the above-described embodiments have been described in detail in order to describe the present invention in an easily understandable manner, and the present invention is not necessarily limited to one including the entire configuration that has been described above. Further, a part of the configuration of a certain embodiment may be replaced with the configuration of another embodiment. Further, the configuration of a certain embodiment may be added with the configuration of another embodiment. Further, addition, deletion or substitution of other configurations may be made with respect to some configurations of each embodiment.

Further, each configuration, function, processing unit, processing means, and the like described above may be, partially or fully, implemented by hardware, for example, by designing it using an integrated circuit and the like, or implemented by software by causing the processor illustrated in FIG. 2 to interpret and execute a program that implements each function. Further, in a case where there are a plurality of functions that are the same in terms of configuration, hardware or software that implements each function may be separately mounted, or a plurality of processes may be performed using the single mounted hardware or software in a time-multiplexed manner. Further, even for the single function in terms of configuration, distributed processing may be performed using a plurality of pieces of hardware or software having the same function.

Information such as programs, tables, and files that realize the respective functions can be stored in a storage device such as a memory, a hard disk, and a solid state drive (SSD), or a storage medium such as an IC card, an SD card, and a DVD.

Further, only a control line and an information line considered to be necessary for the description are illustrated, and all the control lines and information lines required for implementation are not necessarily illustrated. In practice, it can be considered that almost all components are interconnected.

According to the present embodiment, it is possible to provide a wireless communication system and a wireless station device that stabilize communication quality such as a delay time, and to provide information sharing between moving bodies that adopt the wireless communication system.

The disclosed content of the following priority application is incorporated herein as the citation.

Japanese Patent Application No. 2019-11477 (filed on Jan. 25, 2019)

REFERENCE SIGNS LIST 100, 100A, 100B, 100C moving body (automobile)
110 In-vehicle network
120 vehicle-to-vehicle communication unit
121, 121A, 121B vehicle-to-vehicle communication transmitting and receiving unit
122 vehicle-to-vehicle communication processing unit (V2V Proc.)
151 processor (Proc)
152 memory (MEM)
153 Input/output interface (I/F)
200 timer
210 vehicle-to-vehicle communication controller (V2V controller)
220 CAN interface
230 LAN interface
240 LAN packet generator
250 CAN packet generator
260 ranging device
270 modem
280 radio frequency unit
281 RF module (RF)
282 power attenuation unit (Att)
283 antenna (Ant)
290 transmission and reception controller (TRx ctrl)

The invention claimed is:

1. A wireless communication device, which is mounted on a vehicle and performs wireless communication with a communication target wireless communication device using a plurality of frequency channels, wherein
the plurality of frequency channels includes a first channel and a second channel,
the first channel uses a radio signal of a polarization plane orthogonal to at least a polarization plane of a radio signal in the second channel, and
the wireless communication device includes:
a first transceiver corresponding to the first channel and capable of transmitting and receiving the radio signal with two orthogonal polarization planes; and
a second transceiver corresponding to the second channel and capable of transmitting and receiving the radio signal with two orthogonal polarization planes,
wherein the first transceiver and the second transceiver are capable of selecting a first communication mode in which the radio signal is transmitted and received using both of the two orthogonal polarization planes and a second communication mode in which the radio signal is transmitted and received using one of the two orthogonal polarization planes, and in the second communication mode, a polarization plane used by the first transceiver and a polarization plane used by the second transceiver are orthogonal to each other; and wherein the wireless communication device acquires an inter-vehicle distance between the vehicle equipped with the wireless communication device and a second vehicle equipped with the communication target wireless communication device as a first communication target, and switches between the first communication mode and the second communication mode based on the inter-vehicle distance.

2. The wireless communication device according to claim 1, wherein reception power of a radio signal received from the communication target wireless communication device is measured, and the first communication mode and the second communication mode are switched based on the reception power.

3. The wireless communication device according to claim 1, wherein reception power of a radio signal received from the communication target wireless communication device is measured, and a radio signal including information for switching between the first communication mode and the second communication mode based on the reception power is transmitted to the wireless communication device as a second communication target.

4. The wireless communication device according to claim 1, wherein reception power of a radio signal received from the communication target wireless communication device is measured, and at least one of transmission power of the radio signal to be transmitted to the communication target wireless communication device and an attenuation amount of the radio signal when performing reception signal processing of a signal received from the communication target wireless communication device is adjusted based on the reception power.

5. The wireless communication device according to claim 1, wherein reception power of a radio signal received from the communication target wireless communication device is measured, and a radio signal including information for adjusting at least one of transmission power of the radio signal transmitted by the communication target wireless communication device and an attenuation amount of the radio signal when the communication target wireless communication device performs reception signal processing, based on the reception power, is transmitted to the communication target wireless communication device.

6. A wireless communication device which is mounted on a vehicle and performs wireless communication with a communication target wireless communication device using a plurality of frequency channels, wherein the plurality of frequency channels includes a first channel and a second channel;

the first channel uses a radio signal of a polarization plane orthogonal to at least a polarization plane of a radio signal in the second channel; and the wireless communication device includes:
a first transceiver corresponding to the first channel and capable of transmitting and receiving the radio signal with two orthogonal polarization planes; and
a second transceiver corresponding to the second channel and capable of transmitting and receiving the radio signal with two orthogonal polarization planes, wherein the first transceiver and the second transceiver are capable of selecting a first communication mode in which the radio signal is transmitted and received using both of the two orthogonal polarization planes and a second communication mode in which the radio signal is transmitted and received using one of the two orthogonal polarization planes, and in the second communication mode, a polarization plane used by the first transceiver and a polarization plane used by the second transceiver are orthogonal to each other, and wherein the wireless communication device acquires an inter-vehicle distance between the vehicle equipped with the wireless communication device and a second vehicle equipped with the communication target wireless communication device, and transmits a radio signal including information for switching between the first communication mode and the second communication mode based on the inter-vehicle distance, to the communication target wireless communication device.

7. A communication control method being a method for controlling wireless communication, performed using a plurality of frequency channels between a first wireless communication device and a second wireless communication device each mounted on different vehicles, wherein the plurality of frequency channels includes a first channel and a second channel, the first channel uses a radio signal of a polarization plane orthogonal to at least a polarization plane of a radio signal in the second channel; and the communication control method includes:
measuring reception power of a radio signal received from the second wireless communication device by the first wireless communication device and an inter-vehicle distance between a vehicle equipped with the first wireless communication device and the vehicle equipped with the second wireless communication device;
transmitting a radio signal including information for switching between polarization planes of radio signals in the first channel and the second channel based on a reception power and the inter-vehicle distance, from the first wireless communication device to the second wireless communication device; and
switching between the polarization planes of radio signals in the first channel and the second channel based on the radio signal received from the first wireless communication device by the second wireless communication device.

8. The communication control method according to claim 7, comprising:
measuring reception power of the radio signal received by the first wireless communication device from the second wireless communication device and the inter-vehicle distance between the vehicle equipped with the first wireless communication device and the vehicle equipped with the second wireless communication device;
transmitting the radio signal including information for adjusting at least one of transmission power of another radio signal to be transmitted from the second wireless communication device to the first wireless communication device and an attenuation amount when the second wireless communication device received the radio signal from the first wireless communication device based on the reception power and the inter-vehicle distance, from the first wireless communication device to the second wireless communication device; and adjusting at least one of the transmission power and the attenuation amount based on the radio signal received from the first wireless communication device by the second wireless communication device.

9. A wireless communication system comprising a first wireless communication device and a second wireless communication device each mounted on different vehicles, and performing wireless communication using a plurality of frequency channels between the first wireless communication device and the second wireless communication device, wherein the plurality of frequency channels includes a first channel and a second channel, the first channel uses at least a radio signal of a polarization plane orthogonal to a polarization plane of a radio signal in the second channel, the first wireless communication device measures reception power of a radio signal received from the second wireless communication device and an inter-vehicle distance between a vehicle equipped with the first wireless communication device and the vehicle equipped with the second wireless communication device, and transmits a radio signal including information for switching between polarization planes of radio signals in the first channel and the second channel based on a reception power and the inter-vehicle distance, to the second wireless communication device, and the second wireless communication device switches between the polarization planes of radio signals in the first channel and the second channel based on the radio signal received from the first wireless communication device.

10. The wireless communication system according to claim 9, wherein the first wireless communication device measures reception power of the radio signal received from the second wireless communication device and the inter-vehicle distance between the vehicle equipped with the first wireless communication device and the vehicle equipped with the second wireless communication device, and transmits the radio signal including information for adjusting at least one of another transmission power of a radio signal to be transmitted from the second wireless communication device to the first wireless communication device and an attenuation amount when the second wireless communication device receives the radio signal from the first wireless communication device based on the reception power and the inter-vehicle distance, to the second wireless communication device, and the second wireless communication device adjusts at least one of the transmission power and the attenuation amount based on the radio signal received from the first wireless communication device.

\* \* \* \* \*